United States Patent
Kong et al.

(10) Patent No.: US 10,668,418 B2
(45) Date of Patent: Jun. 2, 2020

(54) QUICK RELEASE LOCKING MECHANISM FOR FRONT PANEL OF AIR CONDITIONER, AND AIR CONDITIONER USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Liu-Jun Kong, Shenzhen (CN); Zhao-Guo Fu, Shenzhen (CN); Li-Chin Lu, New Taipei (TW)

(73) Assignees: Fu Tai Hua Industru (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 238 days.

(21) Appl. No.: 15/862,711

(22) Filed: Jan. 5, 2018

(65) Prior Publication Data
US 2019/0126182 A1    May 2, 2019

(30) Foreign Application Priority Data
Oct. 31, 2017    (CN) .......................... 2017 1 1050755

(51) Int. Cl.
| | | |
|---|---|---|
| *F24F 1/0073* | (2019.01) | |
| *F24F 1/0007* | (2019.01) | |
| *F24F 13/20* | (2006.01) | |
| *F24F 13/28* | (2006.01) | |
| *B01D 46/00* | (2006.01) | |

(52) U.S. Cl.
CPC ........ *B01D 46/0004* (2013.01); *F24F 1/0007* (2013.01); *F24F 1/0073* (2019.02); *F24F 13/20* (2013.01); *F24F 13/28* (2013.01); *B01D 2265/06* (2013.01)

(58) Field of Classification Search
CPC ............. B01D 46/0004; B01D 2265/06; F24F 1/0073; F24F 1/0007; F24F 13/20; F24F 13/28
USPC ......... 55/481, 480, 471, 472, 478, 476, 493, 55/506, 498, 482.1, 490, 502, 503, 504; 165/138; 220/4.13, 293, 297, 300
See application file for complete search history.

(56) References Cited

U.S. PATENT DOCUMENTS

| | | | |
|---|---|---|---|
| 6,402,798 B1 * | 6/2002 | Kallsen ................. | B01D 35/30 220/293 |
| 8,002,868 B2 * | 8/2011 | Kim ....................... | F24F 13/20 165/138 |
| 8,236,080 B2 * | 8/2012 | Desjardins ......... | B01D 46/0004 24/505 |

(Continued)

*Primary Examiner* — Minh Chau T Pham
(74) *Attorney, Agent, or Firm* — ScienBiziP, P.C.

(57) ABSTRACT

For an air conditioner, a quick release mechanism to expose a filter includes a body, a front panel, and a locking mechanism. The front panel is pivotally mounted on the body. The locking mechanism has a guide member, a slider, a compressible spring as a biasing member, and a push block. The slider is slidably disposed in the guide member. The slider has a hook portion. The biasing member provides a force to the slider. The push block is held in the guide member when the push block engages the hook portion, and the push block is ejected from the guide member by the biasing member when the push block disengages from the hook portion.

18 Claims, 7 Drawing Sheets

(56) References Cited

U.S. PATENT DOCUMENTS

| | | | | |
|---|---|---|---|---|
| 2002/0073664 A1* | 6/2002 | Campbell | ............... | F24F 13/28 55/471 |
| 2004/0098959 A1* | 5/2004 | Guilliard | ............ | B01D 46/0004 55/490 |
| 2004/0173097 A1* | 9/2004 | Engelland | .......... | B01D 46/0004 95/273 |
| 2010/0139225 A1* | 6/2010 | Mammarella | ...... | B01D 46/0001 55/493 |
| 2010/0162673 A1* | 7/2010 | Grosche | ............ | B01D 46/0004 55/482 |
| 2010/0257828 A1* | 10/2010 | Shimomura | ....... | B01D 46/0004 55/493 |
| 2011/0083407 A1* | 4/2011 | Weber | ................ | B01D 46/0068 55/293 |
| 2013/0067875 A1* | 3/2013 | Hartmann | .......... | B01D 46/0004 55/428 |
| 2014/0033666 A1* | 2/2014 | Menssen | ............ | B01D 46/2418 55/495 |
| 2014/0373491 A1* | 12/2014 | Harbur | ............... | B01D 46/4272 55/425 |

\* cited by examiner

US 10,668,418 B2

QUICK RELEASE LOCKING MECHANISM FOR FRONT PANEL OF AIR CONDITIONER, AND AIR CONDITIONER USING SAME

CROSS REFERENCE TO RELATED APPLICATION

This application claims priority to Chinese Patent Application No. 201711050755.2, filed on Oct. 31, 2017, the disclosure of which is incorporated herein by reference in its entirety.

FIELD

The present disclosure relates to air conditioners, and more particularly to a quick release locking mechanism for a front panel, and an air conditioner using the same.

BACKGROUND

A conventional air conditioner includes a body, a filter, a front panel, and a locking mechanism. The filter is detachably mounted on the body. The front panel is pivotally mounted on the body. The front panel can be pivoted to a closed position to cover the filter, and can be pivoted to an open position to uncover the filter so as to allow a user to remove and clean the filter. The locking mechanism has a recess formed in the body, and a hook portion extending from the front panel. The hook portion engages the recess to hold the front panel in the closed position. However, the operation of the locking mechanism is laborious and inconvenient, and damage to the locking mechanism can happen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
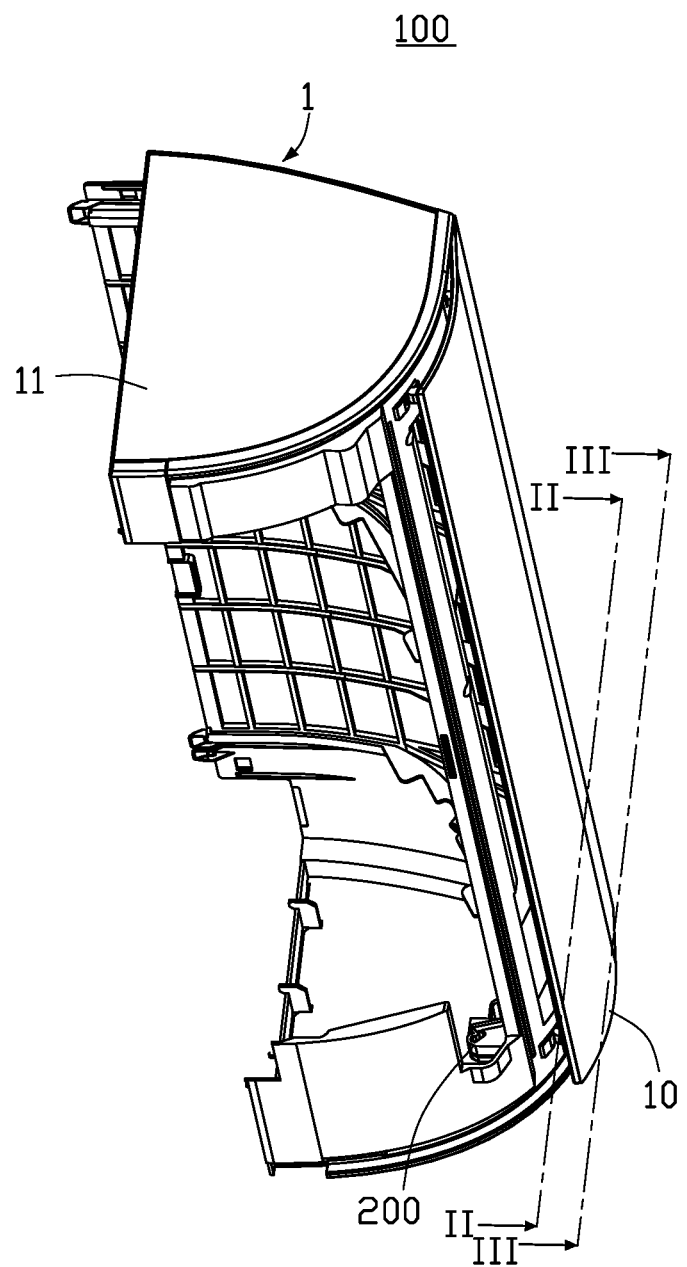
FIG. 1 is a schematic perspective view of an air conditioner showing a front panel removed from a body.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 2:
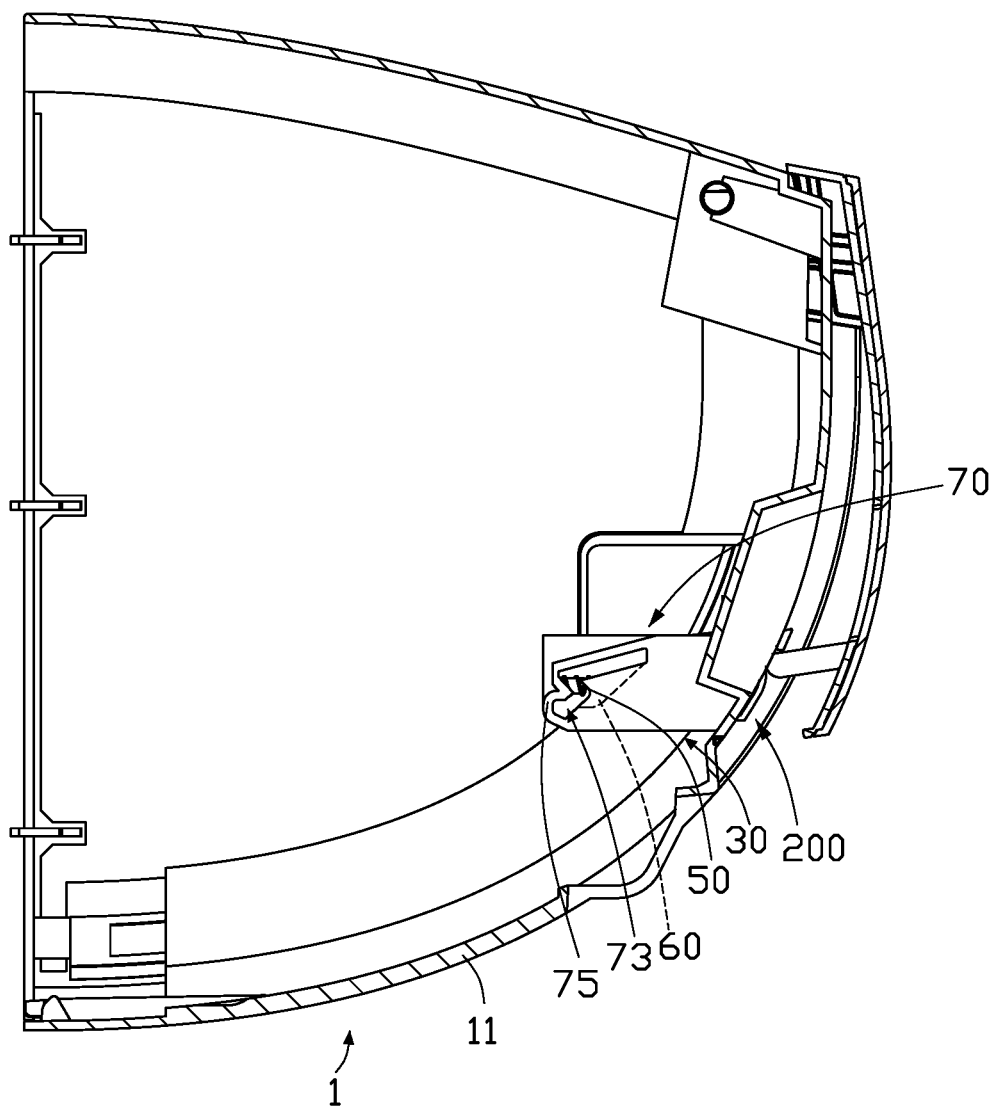
FIG. 2 is a cross-sectional view taken along line II-II in FIG. 1.
Figure 3:
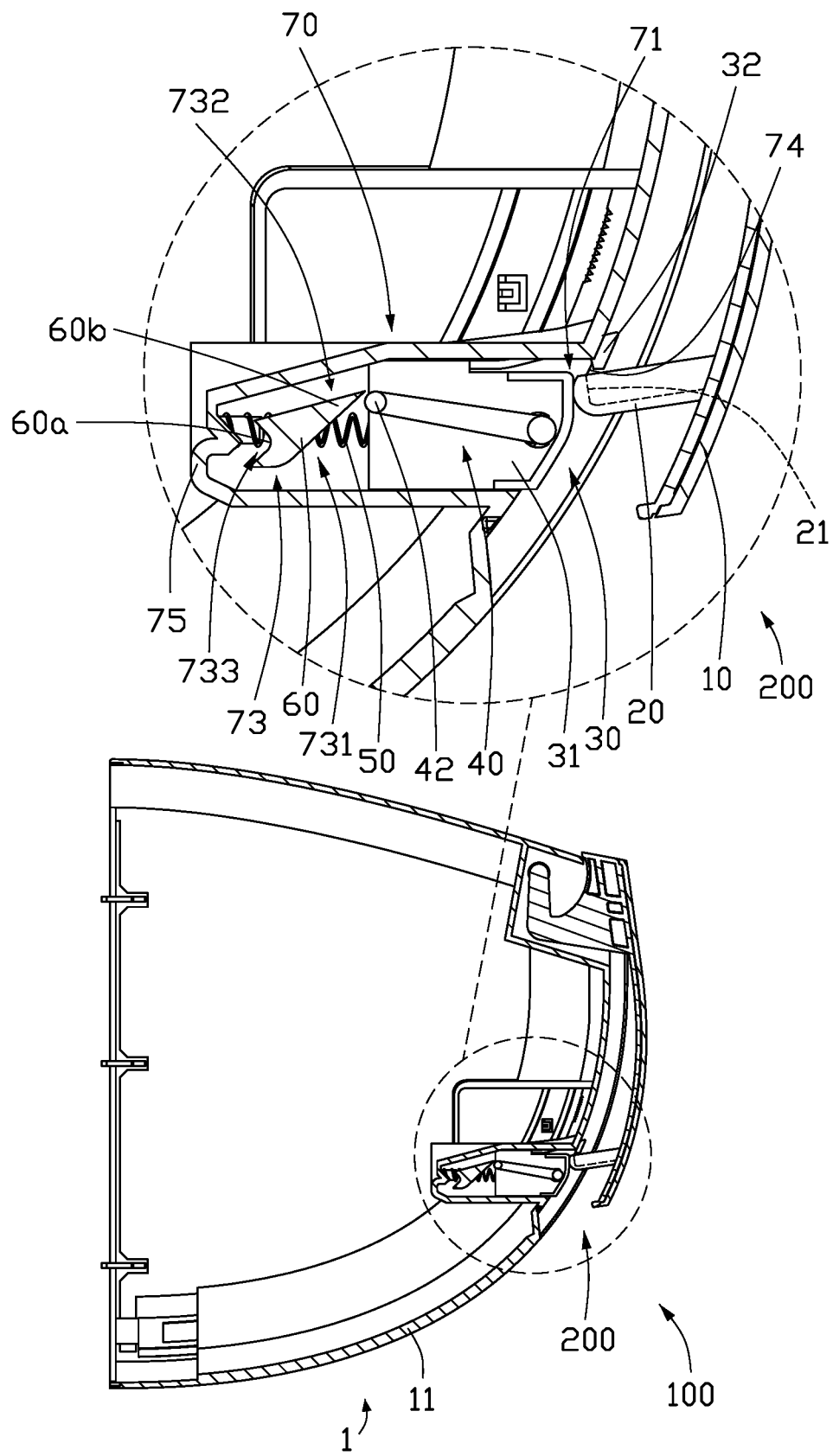
FIG. 3 is a cross-sectional view taken along line in FIG. 1.

With reference to FIG. 1, an exemplary embodiment of a portion of an air conditioner 100 includes a body 1, a front panel 10, and a locking mechanism 200. The body 1 has a housing 11 and components (not shown) in the housing 11 for performing predetermined functions (e.g., air conditioning equipment/vents). The front panel 10 is pivotally mounted on the body 1. The front panel 10 can be pivoted to a closed position to cover a filter (not shown), and can be pivoted to an open position to uncover the filter. The locking mechanism 200 is disposed between the body 1 and the front panel 10. The locking mechanism 200 is used to hold the front panel in the closed position. With further reference to FIGS. 2 and 3, the locking mechanism 200 has a guide member 70, a slider 30, a pivotable member 40, a biasing member 50, and a push block 20.

The guide member 70 is formed on the housing 11 of the body 1. The guide member 70 has an elongated cavity 71, an open end 74, a closed end 75, a guide block 60, and a guide channel 73. The guide block 60 is substantially wedge-shaped, having a guiding end 60a and a converging end 60b. The guide channel 73 is defined between the closed end 75 and the guide block 60. The guide channel 73 has an entry portion 731, an exit portion 732, and a meandering portion 733. The meandering portion 733 is formed between the closed end 75 and the guiding end 60a.

Figure 4:
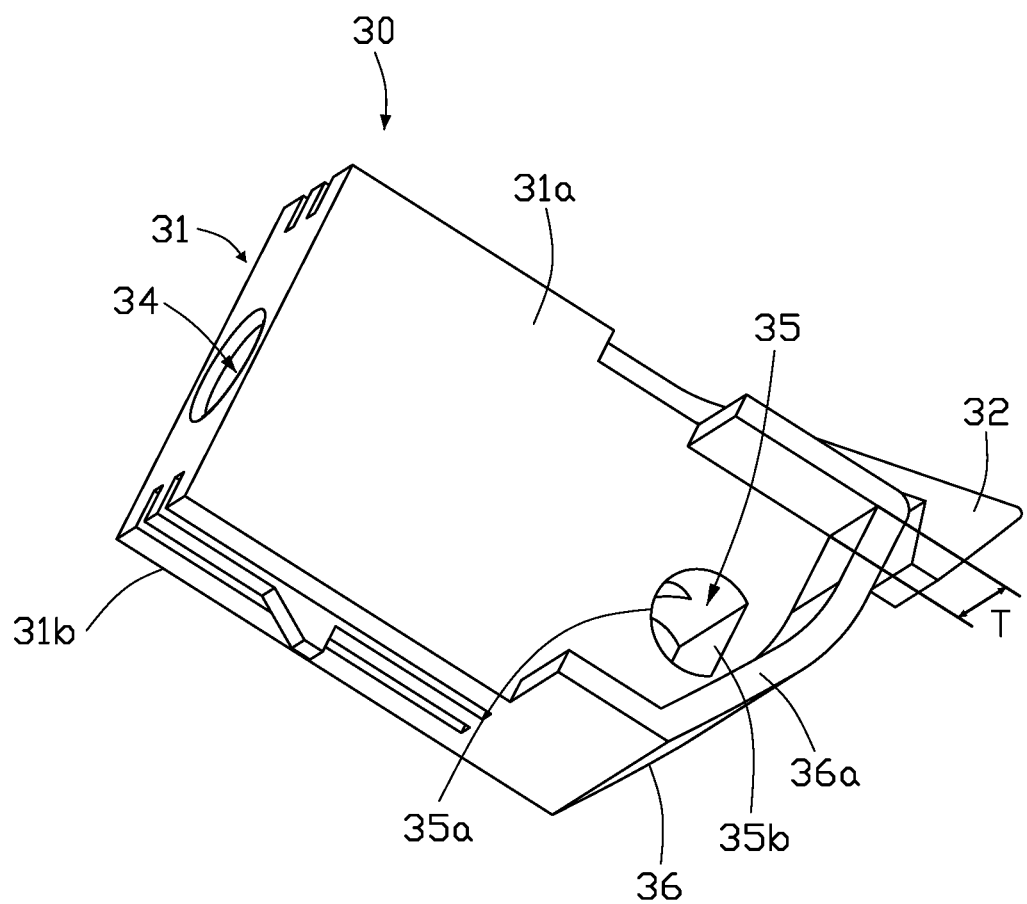
FIG. 4 is a perspective view of a slider of a locking mechanism of the air conditioner of FIG. 1.

The slider 30 is slidably disposed within the elongated cavity 71 of the guide member 70. With reference to FIG. 4, the slider 30 has a body portion 31, a hook portion 32, a front wall 36, a pivot hole 35, and a receiving hole 34. The body portion 31 has a top surface, a bottom surface, a front surface, a rear surface, and two side surfaces 31a, 31b. The hook portion 32 extends from the top surface of the body portion 31. The front wall 36 includes an extending portion 36a extending away from the side surface 31a of the body portion 31. The pivot hole 35 extends entirely through body portion 31, from one side surface 31a to the other side surface 31b of the body portion 31 and is located adjacent to the front wall 36. The pivot hole 35 has a cross-section of a substantially arcuate portion 35a and a substantially straight portion 35b. The receiving hole 34 extends from the rear surface of the body portion 31, through the interior of the body portion 31, and opens into the pivot hole 35.

Figure 5:
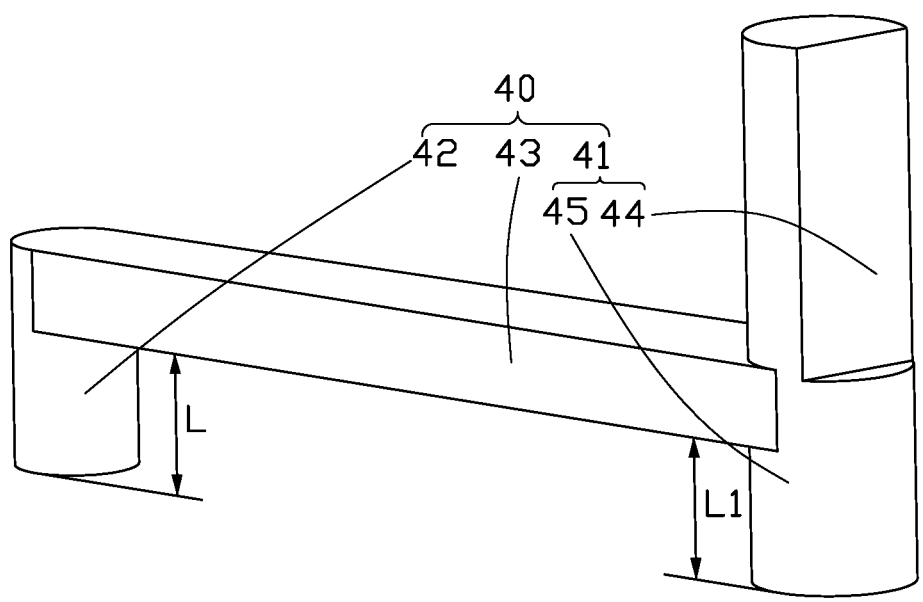
FIG. 5 is a perspective view of a pivotable member of the locking mechanism of the air conditioner of FIG. 1.

With reference to FIG. 5, the pivotable member 40 has a pivot rod 41, an engagement rod 42, and a connecting member 43. The connecting member 43 connects the pivot rod 41 and the engagement rod 42. The pivot rod 41 has an insertion portion 44 having a planar or flat surface, and a protruding portion 45. The insertion portion 44 and the protruding portion 45 extend from opposite sides of the connecting member 43. The insertion portion 44 has a cross-section corresponding to and smaller than the cross-section of the pivot hole 35. The insertion portion 44 is inserted into the pivot hole 35 of the slider 30 such that the pivotable member 40 can be pivoted relative to the slider 30 because the cross-section of the insertion portion 44 is smaller than the cross-section of the pivot hole 35. The protruding portion 45 has a circular cross-section. The engagement rod 42 extends from the same side of the connecting member 43 as the protruding portion 45 of the pivot rod 41. The engagement rod 42 can move within the guide channel 73 of the guide member 70. A length L of the engagement rod 42, a length L1 of the protruding portion 45 of the pivot rod 41, and a thickness T of the extending portion 36a of the slider 30 are approximately the same.

With reference to FIG. 3, the biasing member 50 is disposed in the elongated cavity 71 of the guide member 70. The biasing member 50 has a first end and a second end, the first end being attached to the closed end 75 of the guide member 70 and the second end being received in the receiving hole 34 of the slider 30 and abutting the insertion portion 44 of the pivot rod 41 of the pivotable member 40. The biasing member 50 may be a spring, such as a compression spring. The biasing member 50 can provide a force to the slider 30 to eject the push block 20.

The push block 20 extends from the front panel 10. The push block 20 can push the slider 30 toward the closed end 75 of the guide member 70 such that when the engagement rod 42 of the pivotable member 40 is moved along the guide channel 73 of the guide member 70, the pivotable member 40 will be pivoted. The push block 20 has a recess 21 selectively engaging the hook portion 32 of the slider 30. The recess 21 disengages from the hook portion 32 when the front panel 10 is in the open position, and the recess 21 engages the hook portion 32 when the front panel 10 is in the closed position.

Figure 6:
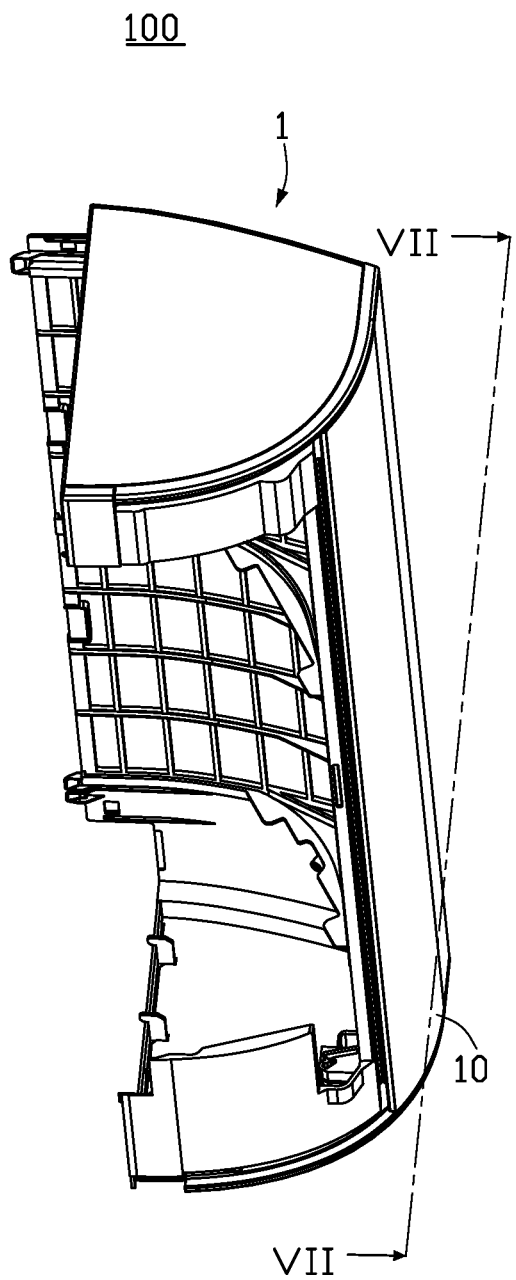
FIG. 6 is a schematic perspective view of the air conditioner of FIG. 1 showing the front panel engaged with the body.
Figure 7:
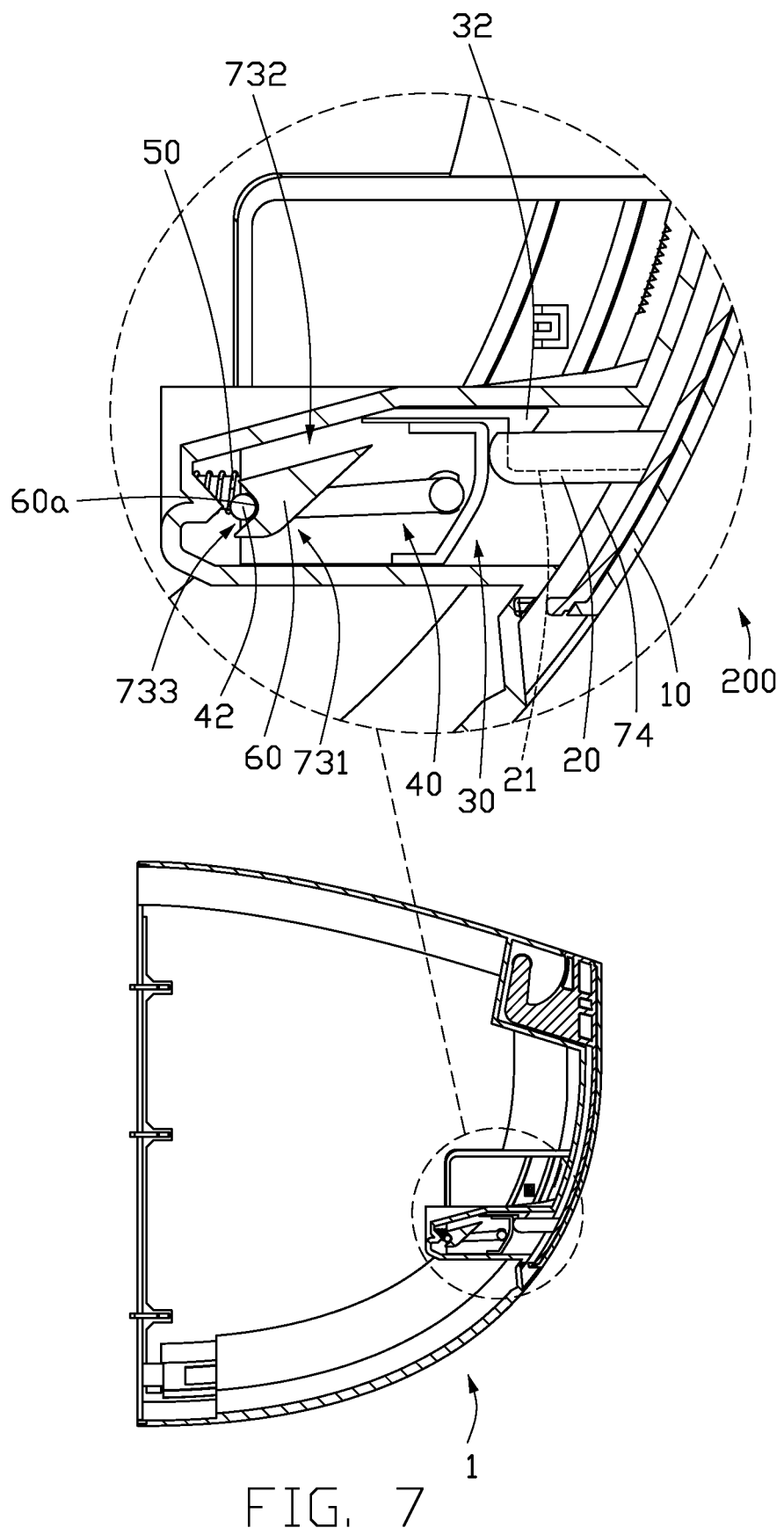
FIG. 7 is a cross-sectional view taken along line VII-VII in FIG. 6.

When the front panel 10 is pivoted to the closed position, the push block 20 pushes the slider 30 toward the closed end 75 of the guide member 70 such that the engagement rod 42 of the pivotable member 40 is moved along the entry portion 731 towards the meandering portion 733 of the guide channel 73 of the guide member 70. Under this circumstance, the biasing member 50 is compressed to store energy. With reference to FIGS. 6 and 7, when the push block 20 stops pushing the slider 30, the engagement rod 42 engages the guiding end 60a of the guide block 60 and the recess 21 of the push block 20 engages the hook portion 32 of the slider 30. The push block 20 is held in the guide member 70 and the front panel 10 is held in the closed position against the energy stored in the biasing member 50.

To open the front panel 10, the front panel 10 is pressed to cause the push block 20 to push the slider 30 such that the engagement rod 42 of the pivotable member 40 disengages from the guiding end 60a of the guide block 60 and the recess 21 of the push block 20 disengages from the hook portion 32 of the slider 30. The engagement rod 42 is then moved along the meandering portion 733 towards the exit portion 732 of the guide channel 73. With reference to FIG. 3, when a pressing of the front panel 10 is stopped, the energy stored in the biasing member 50 causes the slider 30 to slide toward the open end 74 of the guide member 70 to eject the push block 20 from the guide member 70. The front panel 10 with the push block 20 can thus be easily opened from the body 1. In addition, the energy stored in the biasing member 50 also causes the engagement rod 42 to move along the exit portion 732 and back to the entry portion 731.

The locking mechanism 200 is quickly released by pressing the front panel 10, this is convenient and efficient in operation.

The exemplary embodiments shown and described above are only examples. Many details are often found in the art such as the other features of an air conditioner. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A locking mechanism, comprising:
a guide member having an open end and a closed end;
a slider slidably disposed in the guide member, the slider having a hook portion;
a biasing member disposed in the guide member, and mounted between the closed end of the guide member and the slider, the biasing member having a first end and a second end, the biasing member configured to provide a force to the slider;
a pivotable member pivotably coupled to the slider; and
a push block configured to push the slider toward the closed end of the guide member, and the push block selectively engaging the hook portion of the slider;
wherein the push block is held in the guide member when the push block engages the hook portion of the slider, and the push block is ejected from the guide member by the biasing member when the push block disengages from the hook portion of the slider;
wherein the guide member has a guide channel, and the pivotable member has an engagement rod, the engagement rod is configured to move within the guide channel of the guide member.

2. The locking mechanism of claim 1, wherein the slider has a body portion from which the hook portion extends.

3. The locking mechanism of claim 2,
wherein the slider has a receiving hole extending from a rear surface of the body portion; and
wherein the first end of the biasing member is attached to the closed end of the guide member and the second end of the biasing member is received in the receiving hole of the slider.

4. The locking mechanism of claim 3,
wherein the slider has a pivot hole extending from a side surface of the body portion and communicating with the receiving hole, and the pivotable member has a pivot rod inserted into the pivot hole.

5. The locking mechanism of claim 4, wherein the pivotable member has a connecting member connected to the pivot rod.

6. The locking mechanism of claim 5,
wherein the pivot hole has a cross-section of an arcuate portion and a straight portion; and
wherein the pivot rod has:
an insertion portion having a cross-section corresponding to and smaller than the cross-section of the pivot hole, the insertion portion inserted into the pivot hole, the second end of the biasing member abutting the insertion portion; and
a protruding portion having a circular cross-section.

7. The locking mechanism of claim 1, wherein the guide member has a guide block, and the guide channel is defined between the guide block and the closed end of the guide member.

8. The locking mechanism of claim 7, wherein the guide block has a guiding end for engaging the engagement rod.

9. The locking mechanism of claim 2, wherein the push block has a recess selectively engaging the hook portion of the slider.

10. A portion of an air conditioner comprising:
a body;
a front panel pivotally mounted on the body; and
a locking mechanism disposed between the body and the front panel, the locking mechanism comprising:
a guide member formed on the body, and the guide member having an open end and a closed end;
a slider slidably disposed in the guide member, the slider having a hook portion;
a biasing member disposed in the guide member, and mounted between the closed end of the guide member and the slider, the biasing member having a first end and a second end, the biasing member configured to provide a force to the slider;
a pivotable member pivotably coupled to the slider; and
a push block extending from the front panel, the push block configured to push the slider toward the closed end of the guide member, and the push block selectively engaging the hook portion of the slider;
wherein the push block is held in the guide member when the push block engages the hook portion of the slider, and the push block is ejected from the guide member by the biasing member when the push block disengages from the hook portion of the slider;
wherein the guide member has a guide channel, and the pivotable member has an engagement rod, the engagement rod is configured to move within the guide channel of the guide member.

11. The portion of the air conditioner of claim 10, wherein the slider has a body portion from which the hook portion extends.

12. The portion of the air conditioner of claim 11,
wherein the slider has a receiving hole extending from a rear surface of the body portion; and
wherein the first end of the biasing member is attached to the closed end of the guide member and the second end of the biasing member is received in the receiving hole of the slider.

13. The portion of the air conditioner of claim 12,
wherein the slider has a pivot hole extending from a side surface of the body portion and communicating with the receiving hole; and
the pivotable member having a pivot rod inserted into the pivot hole.

14. The portion of the air conditioner of claim 13, wherein the pivotable member has a connecting member connected to the pivot rod.

15. The portion of the air conditioner of claim 14,
wherein the pivot hole has a cross-section of an arcuate portion and a straight portion; and
wherein the pivot rod has:
an insertion portion having a cross-section corresponding to and smaller than the cross-section of the pivot hole, the insertion portion inserted into the pivot hole, the second end of the biasing member abutting the insertion portion; and
a protruding portion having a circular cross-section.

16. The portion of the air conditioner of claim 10, wherein the guide member has a guide block, and the guide channel is defined between the guide block and the closed end of the guide member.

17. The portion of the air conditioner of claim 16, wherein the guide block has a guiding end for engaging the engagement rod.

18. The portion of the air conditioner of claim 11, wherein the push block has a recess selectively engaging the hook portion of the slider.

* * * * *